US012766913B2

(12) United States Patent
Kim et al.

(10) Patent No.: US 12,766,913 B2
(45) Date of Patent: Oct. 20, 2026

(54) DUCT APPARATUS FOR A MOBILITY VEHICLE

(71) Applicants: HYUNDAI MOTOR COMPANY, Seoul (KR); KIA CORPORATION, Seoul (KR)

(72) Inventors: Bum Jin Kim, Hwaseong-si (KR); Seo Ha Kang, Hanam-si (KR); Sun Eui Kim, Ansan-si (KR); Jin Won Kim, Pyeongtaek-si (KR); Jun Young Lim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 387 days.

(21) Appl. No.: 18/514,817

(22) Filed: Nov. 20, 2023

(65) Prior Publication Data

US 2025/0074141 A1 Mar. 6, 2025

(30) Foreign Application Priority Data

Aug. 28, 2023 (KR) ........................ 10-2023-0113048

(51) Int. Cl.
*B60H 1/00* (2006.01)

(52) U.S. Cl.
CPC ..... *B60H 1/00564* (2013.01); *B60H 1/00285* (2013.01); *B60H 2001/00092* (2013.01); *B60H 2001/002* (2013.01)

(58) Field of Classification Search
CPC ............ B60H 1/00564; B60H 1/00285; B60H 2001/00092; B60H 2001/002
USPC ............................................................ 454/69
See application file for complete search history.

(56) References Cited

U.S. PATENT DOCUMENTS

| | | | | |
|---|---|---|---|---|
| 5,392,873 A * | 2/1995 | Masuyama | B60L 50/64 | 180/68.5 |
| 5,490,572 A * | 2/1996 | Tajiri | H01M 10/6563 | 180/68.5 |
| 7,654,351 B2 * | 2/2010 | Koike | H01M 50/278 | 180/68.5 |
| 9,160,042 B2 * | 10/2015 | Fujii | H01M 10/625 | |
| 9,627,721 B2 * | 4/2017 | Kosaki | H01M 10/613 | |
| 9,770,961 B2 * | 9/2017 | Murata | H01M 10/663 | |
| 2021/0210811 A1 * | 7/2021 | Uto | B60K 11/06 | |
| 2021/0257694 A1 * | 8/2021 | Kim | B60L 50/64 | |

FOREIGN PATENT DOCUMENTS

KR 20120094697 A 8/2012

* cited by examiner

*Primary Examiner* — Avinash A Savani
*Assistant Examiner* — Dana K Tighe
(74) *Attorney, Agent, or Firm* — Lempia Summerfield Katz LLC

(57) ABSTRACT

A duct apparatus for a mobility vehicle secures an interior space by providing a battery case under a body floor, has a simplified cooling structure by cooling a battery module using inside air. The duct apparatus secures interior comport through the optimized arrangement of an air-conditioning duct and a cooling duct of the battery module, and improves air-conditioning and battery cooling efficiency.

9 Claims, 5 Drawing Sheets

DUCT APPARATUS FOR A MOBILITY VEHICLE

CROSS REFERENCE TO RELATED APPLICATION

The present application claims priority to and the benefit of Korean Patent Application No. 10-2023-0113048, filed Aug. 28, 2023, the entire contents of which are incorporated herein by reference.

BACKGROUND

Field

The present disclosure relates to a duct apparatus for a mobility vehicle, which has a built-in battery module and a cooling device for cooling the battery module.

Description of the Related Art

Recently, interest in eco-friendly vehicles has been increasing due to environmental issues, a high oil price, or the like, and an electric vehicle that allows the vehicle to travel using electrical energy is being variously developed.

Various types of the electric vehicles, including a battery-powered electric vehicle (EV), a fuel cell EV using a fuel cell and an electric motor, a hybrid EV using the electric motor and an engine together, and the like, are currently under development.

In particular, the electric vehicle has a battery module for storing electrical energy, and the battery module accommodates a plurality of battery cell units inside a battery case. Since the battery case has a large volume and weight, it is important to secure a mounting space in a body in order to mount the battery case in the body. In addition, the cooling of the battery module is required due to high temperature heat generated when the vehicle is driven, but an optimal design of the battery case considering the mounting space of the body and the cooling of the battery module is not being conducted.

In particular, when air cooling is used to cool the battery module, a duct structure for circulating air cooling the battery module is applied. In addition, a duct for providing air-conditioning air is also provided to rear row seats, and a method of securing an interior space without each duct interfering with other components and securing an air circulation space is required.

The matters explained in this Background section are provided only to enhance the understanding of the background of the present disclosure and should not be taken as acknowledging that they correspond to the prior art already known to those having ordinary skill in the art.

SUMMARY

The present disclosure is directed to a duct apparatus for a mobility vehicle, which secures an interior space by providing a battery case under a body floor, and thus the duct apparatus has a simplified cooling structure by cooling a battery module using inside air. The duct apparatus secures interior comport through the optimized arrangement of an air-conditioning duct and a cooling duct of the battery module, and secures air-conditioning and battery cooling efficiency.

According to an embodiment of the present disclosure, a duct apparatus for a mobility vehicle includes: a body floor on which a plurality of seats are provided, and a battery case provided under the body floor. In particular, the battery case accommodates a built-in battery module and includes an air inlet through which air is sucked and an air outlet through which the air is discharged. The duct apparatus also includes a suction duct communicatively connected to the air inlet and arranged above the body floor, a discharge duct communicatively connected to the air outlet and extending along the body floor, and an air-conditioning duct which is communicatively connected to an air conditioner and extends along the body floor. A portion of the air-conditioning duct is configured to extend to vertically overlap the discharge duct.

The suction duct may be positioned under a front side seat, and the discharge duct may be formed to extend downward or laterally from a rear side seat.

In one embodiment, the battery case is provided under a front seat on the body floor, the suction duct may be provided under the front seat, and the discharge duct may be provided in front of the suction duct and arranged under the front seat. The discharge duct may extend from the front seat toward a rear seat.

The air-conditioning duct may include an inlet part connected to the air conditioner and a plurality of outlet parts branched by detouring to both sides of the suction duct. A first outlet part among the outlet parts may extend to vertically overlap the discharge duct.

Among the outlet parts, one outlet part may extend up to the front side seat, and another outlet part may extend up to the rear side seat.

In the air-conditioning duct, the outlet part extending up to the front side seat among the plurality of outlet parts may be formed to overlap the discharge duct.

The outlet part of the air-conditioning duct, which overlaps the discharge duct, may be positioned above the discharge duct.

The battery case may be disposed between a center of the mobility vehicle and an outside of the mobility vehicle, and a portion in which the discharge duct and the air-conditioning duct overlap each other may be provided outside the mobility vehicle based on the suction duct.

The suction duct, the discharge duct, and the air-conditioning duct may be provided between a pair of seat rails (e.g., a first seat rail and a second seat rail) and under a seat.

The suction duct, the discharge duct, and the air-conditioning duct may be arranged in the order of one seat rail, the air-conditioning duct, the suction duct, the discharge duct, and the other seat rail from an inside to an outside of the mobility vehicle.

The duct apparatus for a mobility vehicle having the above-described structure can secure the interior space by providing the battery case under the body floor, have the simplified cooling structure by cooling the battery module using inside air, secure the interior comport through the optimized arrangement of the air-conditioning duct and the cooling duct of the battery module, and secure air-conditioning and battery cooling efficiency.

Figure 1:
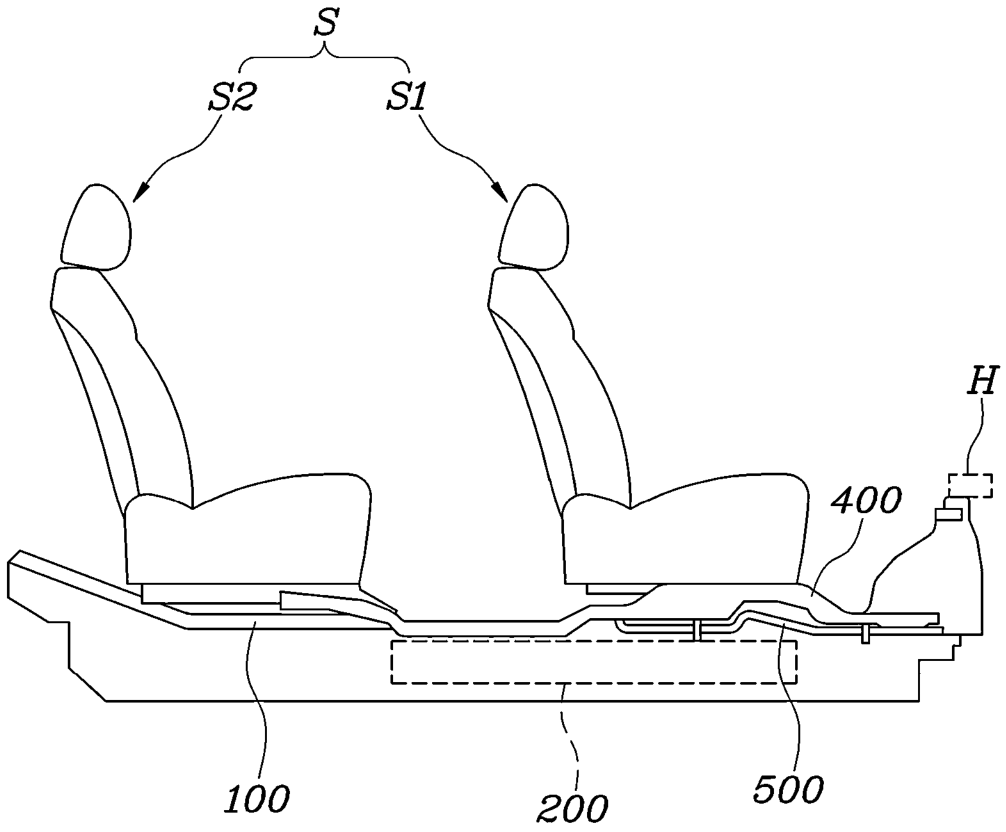
FIG. 1 is a view illustrating a duct apparatus for a mobility vehicle according to one embodiment of the present disclosure.
Figure 2:
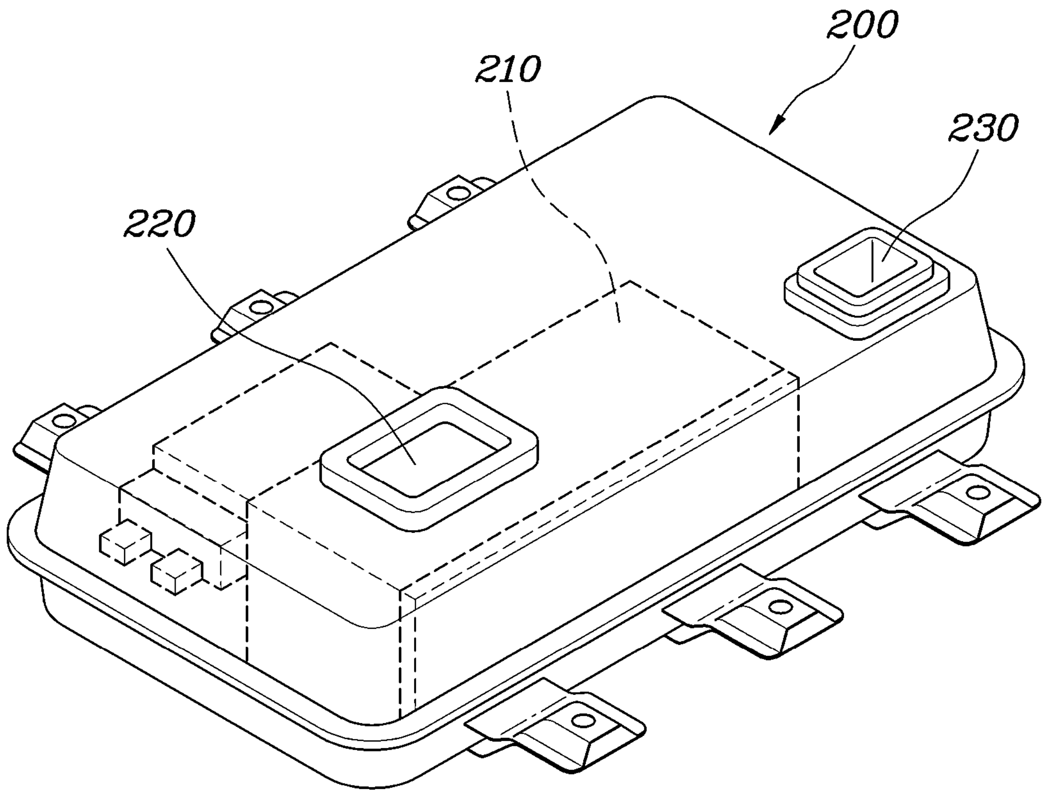
FIG. 2 is a view illustrating a battery case according to one embodiment of the present disclosure.

The drawings described herein are for illustration purposes only and are not intended to limit the scope of the present disclosure in any way.

DETAILED DESCRIPTION

Hereinafter, embodiments disclosed in this specification are described in detail with reference to the accompanying drawings, and the same or similar components are denoted by the same reference numerals regardless of the drawing symbols, and overlapping descriptions thereof have been omitted.

The suffixes "module" and "unit" for components used in the following description are given or used interchangeably in consideration of ease of writing the specification and not have meanings or roles that are distinct from each other by themselves.

In describing the embodiments disclosed in this specification, when it is determined that a detailed description of a related known technology may obscure the gist of the embodiments disclosed in this specification, a detailed description thereof has been omitted. In addition, the accompanying drawings are only for easy understanding of the embodiments disclosed in this specification, and it should be understood that the technical spirit disclosed in this specification is not limited by the accompanying drawings, and all changes, equivalents, or substitutes included in the spirit and technical scope of the present disclosure are included in the accompanying drawings.

Terms including ordinal numbers such as first or second may be used to describe various components, but the components are not limited by the terms. The terms are used only for the purpose of distinguishing one component from another.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The singular expression includes the plural expression unless the context clearly dictates otherwise. When a component, device, element, or the like of the present disclosure is described as having a purpose or performing an operation, function, or the like, the component, device, or element should be considered herein as being "configured to" meet that purpose or to perform that operation or function.

In the specification, it should be understood that terms such as "comprise" or "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

Hereinafter, a duct apparatus for a mobility vehicle according to an embodiment of the present disclosure is described with reference to the accompanying drawings.

According to an embodiment of the present disclosure, as illustrated in FIGS. 1 to 5, a duct apparatus for a mobility vehicle includes: a body floor 100 on which a plurality of seats S1, S2 (collectively "S") are provided, and a battery case 200 which is provided under the body floor 100. The battery case 200 accommodates a built-in battery module 210 and has an air inlet 220 through which air is sucked and an air outlet 230 through which the air is discharged. The duct apparatus further includes: a suction duct 300 arranged above the body floor 100 and communicatively connected to the air inlet 220, a discharge duct 400 communicatively connected to the air outlet 230 and extending along the body floor 100, and an air-conditioning duct 500 which is communicatively connected to an air conditioner H and extends along the body floor 100. In one embodiment, a portion of the air-conditioning duct 500 extends to vertically overlap the discharge duct 400.

The body floor 100 may become an interior floor of the mobility vehicle and have the plurality of seats S provided thereon.

The battery case 200 may have the built-in battery module 210 for supplying power and be mounted under the body floor 100.

The battery case 200 may be installed in a trunk tire well, a rear side of or under a rear seat, or the like, but in the present disclosure, the battery case 200 is provided under first row seats, which are electric heating seats, to secure the utilization of an interior space.

A blowing device for cooling various electrical components and circulating air in addition to the battery module 210 may be provided inside the battery case 200. In addition, the air inlet 220 through which air for cooling the battery module 210 is introduced and the air outlet 230 through which the air cooling the battery module 210 is discharged are formed in the battery case 200 so that the air for cooling the battery module 210 may circulate.

The suction duct 300 may be communicatively connected to the air inlet 220 of the battery case 200 so that the inside air may flow into the battery case 200. The suction duct 300 may be provided under the seat "S" provided on the body floor 100, configured not to be exposed to an interior, and formed in a shape that does not interfere with the seat S.

The discharge duct 400 may be communicatively connected to the air outlet 230 of the battery case 200 so that the air cooling the battery module 210 may be discharged to the outside. The discharge duct 400 may extend along a bottom surface on an upper portion of the body floor 100 and form a discharge path to the rear of the mobility vehicle. The discharge duct 400 may be embedded in an interior bottom surface.

In the present disclosure, since the plurality of seats (S1, S2) are provided, second row seats and third row seats may be further provided behind the first row seats. Therefore, the air-conditioning duct 500 is provided to provide air-conditioning air to a rear seat side.

The air-conditioning duct 500 is communicatively connected to the air conditioner H and extends along the body floor 100. In other words, the air conditioner H may be provided at the front of the mobility vehicle, and the air-conditioning duct 500 connected to the air conditioner "H" may extend up to a rear side seat S2 including the second row seats and the third row seats to provide air-conditioning air to the rear side seat S2.

In one embodiment, the suction duct 300, the discharge duct 400, and the air-conditioning duct 500 are provided under the first row seats, which are a front side seat, and a path and a cross-sectional area of each duct should be secured to satisfy the requirement including an amount of circulation of air. In addition, branched paths should be formed in the air-conditioning duct 500 when the rear side seats include the second row seats and the third row seats.

To this end, according to the present disclosure, it is possible to secure the comport of the interior space while satisfying the requirement of each duct through optimal designs of the suction duct 300, the discharge duct 400, and the air-conditioning duct 500 according to a mounting position of the battery case 200.

In other words, a portion of the air-conditioning duct 500 according to the present disclosure extends to vertically overlap the discharge duct 400.

The suction duct 300, the discharge duct 400, and the air-conditioning duct 500 are provided on the body floor 100, and the plurality of ducts should be prevented from interfering with other components including the seat S and secure cross-sectional areas so that air may sufficiently circulate. Therefore, since the air-conditioning duct 500 extends rearward along the body floor 100 and a portion thereof overlaps the discharge duct 400, the air-conditioning duct 500 and the discharge duct 400 may be provided by using a portion in which interference with other components is avoided. In addition, since the air-conditioning duct 500 forms the branched paths and only a portion thereof overlaps the discharge duct 400, it is possible to optimize the arrangement and it is easy to secure the cross-sectional area for air circulation.

Specifically describing the above-described present disclosure, as illustrated in FIG. 1, the suction duct 300 may be positioned under a front side seat S1, and the discharge duct 400 may be formed to extend downward or laterally from a rear side seat S2.

In other words, the suction duct 300, the discharge duct 400, and the air-conditioning duct 500 may be provided between a pair of seat rails R under the seat S. The seat S has a structure having a variable position and has the pair of seat rails R, and the seat S has an adjustable position while sliding along the seat rails R. Here, since the seat S is seated on the seat rails R and the seat rails R are formed to have a certain heights, there is an unused space under the seat S and between the pair of seat rails R. According to the present disclosure, by providing the suction duct 300, the discharge duct 400, and the air-conditioning duct 500 using the unused space between the seat rails R, it is possible to prevent a degradation in the interior comport caused by each duct entering the interior space and secure the amount of circulation of air by optimizing the position and the cross-sectional area of each duct.

According to one embodiment of the present disclosure, the plurality of seats S may be provided inside the mobility vehicle, and the plurality of seats S may be classified into the front side seat S1 and the rear side seat S2, in which the front side seat S1 may correspond to the first row seats, and the rear side seat S2 may correspond to the second row seats. In addition, three row seats may also be provided as a rearmost seat S.

In particular, since the suction duct 300 sucks the inside air under the front side seat S1, the inside air with less pollution is sucked into the battery case 200, and interference with occupants or structures is avoided.

The discharge duct 400 is provided under or on a side portion of the rear side seat S2 and thus does not interfere with other structures, and the air discharged after cooling the battery module 210 is avoided from being transmitted to the occupants.

In addition, the discharge duct 400 may be configured to discharge the air cooling the battery module 210 to an inside or an outside of the mobility vehicle. In other words, the discharge duct 400 may be configured to be communicatively connected to the air outlet 230 of the battery case 200, and extend downward or laterally from the rear side seat S2 to discharge air to the inside or extend to the outside to discharge the air to the outside. In addition, by applying a valve structure, the discharge duct 400 may be configured to selectively discharge the air discharged through the discharge duct 400 to the inside or the outside of the mobility vehicle.

Meanwhile, as the battery case 200 is provided under the front seat S on the body floor 100, the suction duct 300 may be provided under the front seat S, and the discharge duct 400 may be provided in front of the suction duct 300 under the front seat S and may extend from the front seat S toward the rear seat S.

As described above, since the battery case 200 is provided under the front seat S, it is possible to secure a spare space such as a trunk space and a space for a spare tire. In addition, the suction duct 300 connected to the battery case 200 is provided under the front seat S, the discharge duct 400 is provided in front of the suction duct 300 under the front seat S, and the discharge duct 400 is formed to extend rearward from the front seat S.

In one embodiment, the battery module 210 may be disposed to be biased inward in the battery case 200. As described above, since the battery module 210 is disposed to be biased inward in the battery case 200, it is possible to reduce an impact applied to the battery module 210 when an external impact occurs, and the suction duct 300 through which the air for cooling the battery module 210 circulates may be disposed to be biased to any one side under the seat to avoid interference with the discharge duct 400 and the air-conditioning duct 500.

In addition, when the battery case 200 is provided under the front seat S, a foot space of the front seat may also be used depending on the size of the battery module 210. Therefore, the suction duct 300 for sucking the inside air may be provided under the seat because it should be configured to secure a relatively larger height, and the discharge duct 400 may have a relatively smaller size because it has a shape extending rearward, and thus even when the discharge duct 400 is provided in front of the suction duct 300, it is possible to reduce interference with other components when extending rearward under the seat.

Therefore, even when the suction duct 300 is provided under the front seat S, the suction duct 300 does not interfere with an occupant's feet, and even when the discharge duct 400 is positioned in front of the suction duct 300 under the front seat S, the discharge duct 400 may extend rearward along the bottom surface to secure a space for the occupant's lower body.

Figure 3:
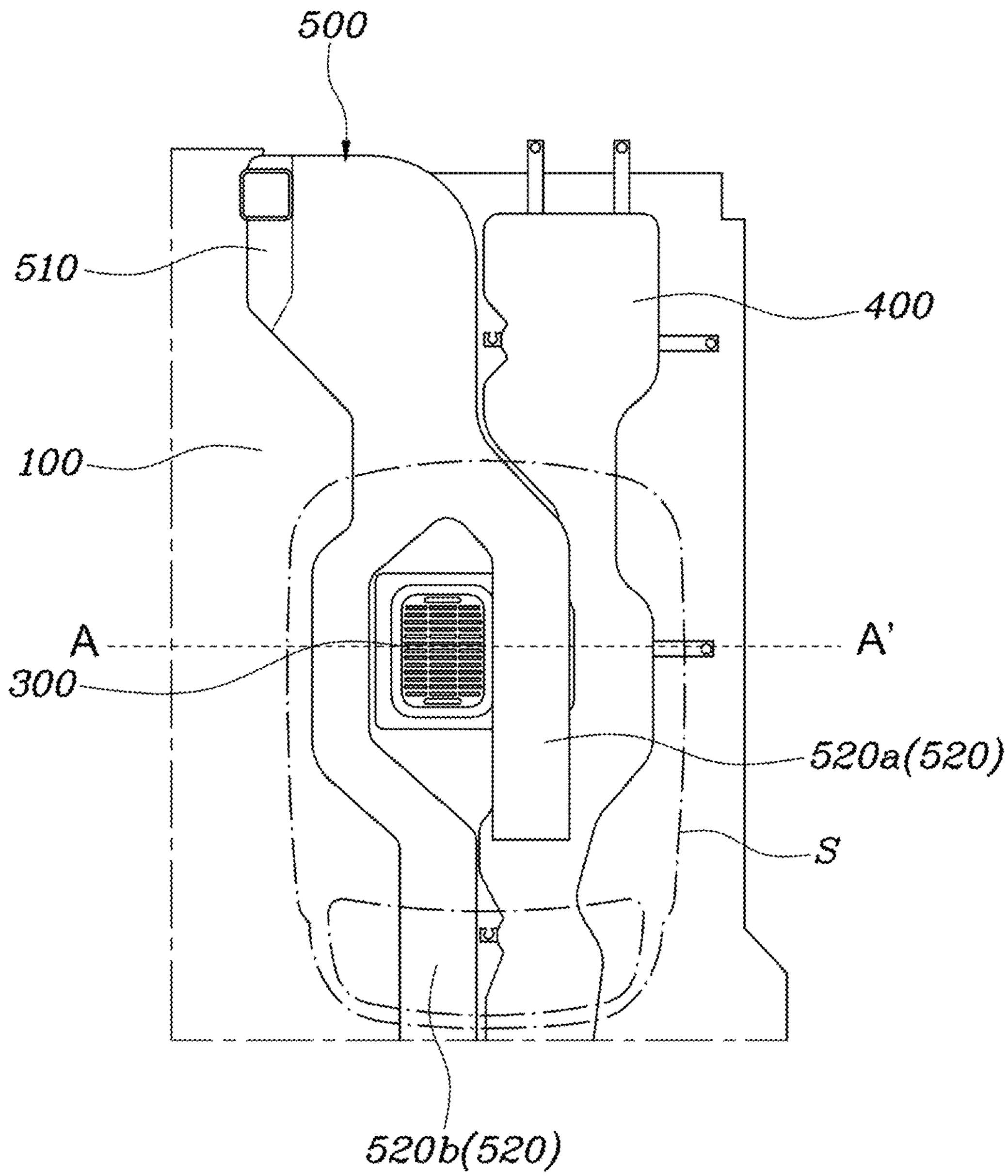
FIG. 3 is a view illustrating each duct of the duct apparatus for a mobility vehicle illustrated in FIG. 1.
Figure 4:
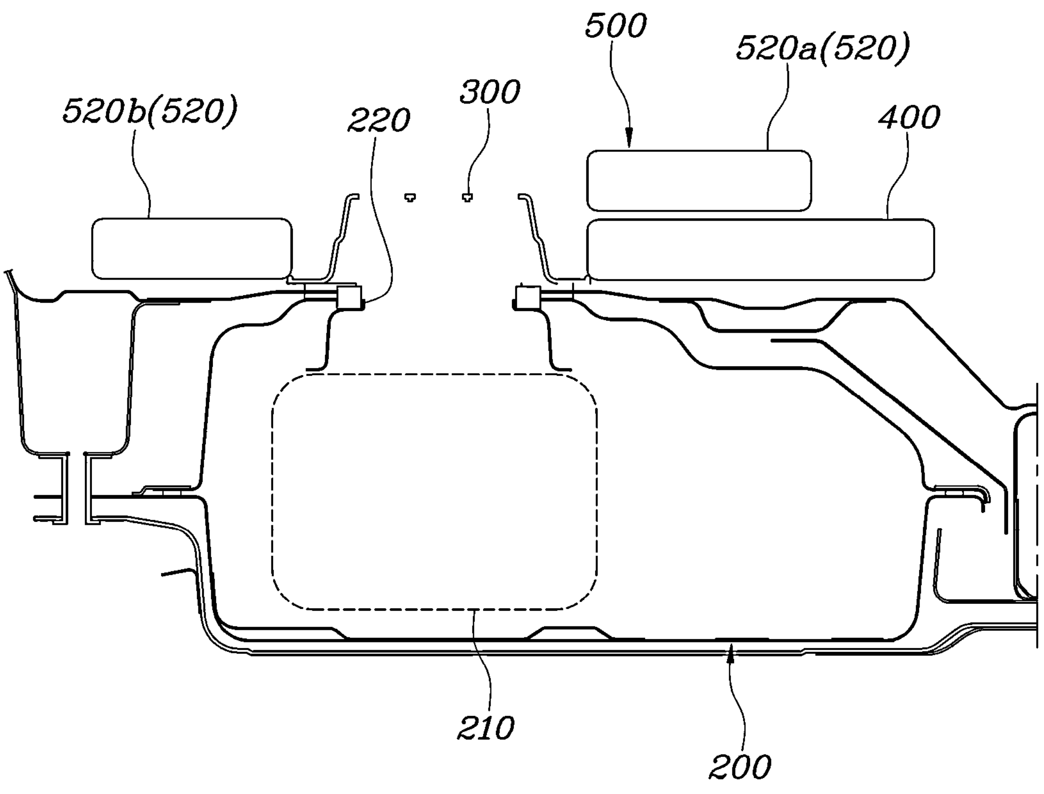
FIG. 4 is a cross-sectional view illustrating the duct apparatus for a mobility vehicle along line A-A', which includes the battery case in FIG. 3.

In one embodiment, as illustrated in FIG. 3, the air-conditioning duct 500 may include an inlet part 510 connected to the air conditioner H and a plurality of outlet parts 520 branched by detouring (namely, branched off) to both sides of the suction duct 300. In particular, any one of the outlet parts 520, for example an outlet part 520*a*, may extend to vertically overlap the discharge duct 400.

In other words, the air-conditioning duct 500 is provided so that the air-conditioning air provided from the air conditioner H is provided to the rear side seat S2, the inlet part 510 is connected to the air conditioner H, and the plurality of outlet parts 520 extend to the rear of the mobility vehicle.

In the air-conditioning duct 500, any one outlet part 520*a* (e.g., a first outlet part) may extend up to the front side seat S1, and the other outlet part 520*b* (e.g., a second outlet part) may extend up to the rear side seat S2. Therefore, the first outlet part 520*a* of the outlet parts 520 of the air-conditioning duct 500 may provide air-conditioning air to the rear side seat S2, which is the second row seats, under the front side seat S1, and the other outlet part 520*b* (i.e., the second outlet part) may provide the air-conditioning air to the third row seats, which are the rearmost seats, under the rear side seat S2, which is the second row seats.

In particular, each outlet part 520 of the air-conditioning duct 500 may extend after detouring to both sides of the suction duct 300 and thus may be disposed to avoid the interference with other components including the seat S under the seat S. In addition, any one of the plurality of outlet parts 520 may be configured to overlap the discharge duct 400 to optimize the arrangement of the air-conditioning duct 500 and the discharge duct 400 in a limited space under the seat S, and it is possible to secure the cross-sectional area of each duct by optimizing the arrangement, thereby sufficiently providing an amount of circulation of the air-conditioning air.

Specifically, the air-conditioning duct 500 may be formed so that the outlet part 520*a* extending up to the front side seat S1 among the plurality of outlet parts 520 overlaps the discharge duct 400.

In other words, since the outlet part 520 of the air-conditioning duct 500 and the discharge duct 400 are disposed to overlap each other and thus installation heights thereof increase, when a portion in which the air-conditioning duct 500 and the discharge duct 400 overlap each other departs from a lower side of the seat S, interference with the occupant may occur. Therefore, since the air-conditioning duct 500 is configured so that the outlet part 520 extending only up to the front side seat S1 among the plurality of outlet parts 520 overlaps the discharge duct 400, even when the discharge duct 400 and the air-conditioning duct 500 are provided on the body floor 100, it is possible to minimize interference with the interior space, thereby securing the occupant's comport. Here, since the outlet part 520*b* extending up to the rear side seat S2 among the plurality of outlet parts 520 of the air-conditioning duct 500 is embedded in the interior bottom surface, it is possible to not only avoid the interference with the occupant sitting on the rear side seat S2 but also secure a boarding space.

The outlet part 520*a* of the air-conditioning duct 500, which overlaps the discharge duct 400, may be positioned above the discharge duct 400. As described above, the outlet part 520 of the air-conditioning duct 500 may be positioned above the discharge duct 400 and thus may smoothly provide air-conditioning air to the occupant sitting on the rear side seat S2. In addition, through the arrangement in which, as the discharge duct 400 is communicatively connected to the battery case 200, the discharge duct 400 is positioned above the battery case 200, and the outlet part 520 of the air-conditioning duct 500 is provided above the discharge duct 400, not only the battery case 200 and the discharge duct 400 may be connected, but also the air-conditioning duct 500 may be positioned not to interfere with the discharge duct 400. Therefore, an assembling sequence may be set in the order of the battery case 200, the discharge duct 400, and the air-conditioning duct 500, and each duct may be optimally disposed without interference, thereby reducing the installation space.

In one embodiment, as illustrated in FIG. 3, the battery case 200 may be disposed between a center of the mobility vehicle and an outside of the mobility vehicle, and the portion in which the discharge duct 400 and the air-conditioning duct 500 overlap each other may be provided between the outside of the mobility vehicle and the suction duct 300.

As described above, since the battery case 200 is disposed between the center of the mobility vehicle and the outside of the mobility vehicle, it is possible to reduce an impact applied to the battery case 200 from an external impact, thereby securing the collision performance of the battery case 200.

In addition, since the suction duct 300 may be disposed inside the mobility vehicle in the battery case 200, and portions of the discharge duct 400 and the air-conditioning duct 500 may be disposed relatively outside the mobility vehicle, an impact applied from the outside of the mobility vehicle may also be absorbed through each duct.

In addition, since various components other than the battery case 200 are provided on the body floor 100, the discharge duct 400 and the air-conditioning duct 500 may be provided outside the mobility vehicle to avoid interference with the components.

Figure 5:
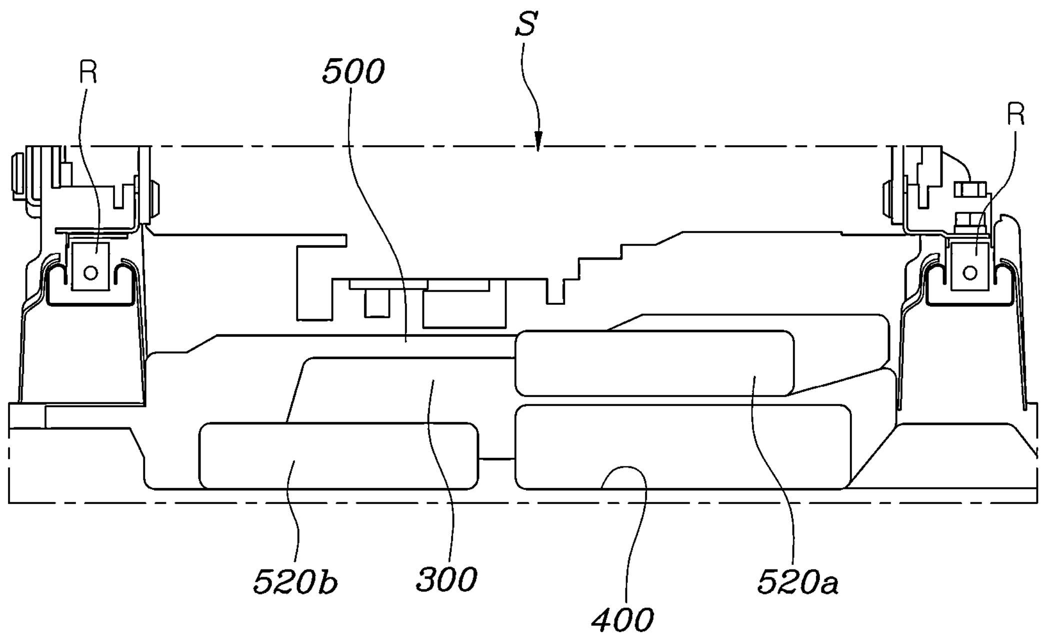
FIG. 5 is a cross-sectional view illustrating the duct apparatus for a mobility vehicle along line A-A', which includes seat rails in FIG. 3.

According to the above description, as illustrated in FIG. 5, in the present disclosure, the suction duct 300, the discharge duct 400, and the air-conditioning duct 500 may be disposed between the pair of seat rails R in the order of one seat rail R, the air-conditioning duct 500, the suction duct 300, the discharge duct 400, and the other seat rail R from the inside to the outside of the mobility vehicle.

As described above, when the suction duct 300, the discharge duct 400, and the air-conditioning duct 500 are provided between the pair of seat rails R, the suction duct 300 may be disposed close to the seat rail R disposed at the left side depending on the installation position of the battery module 210. Therefore, since the battery module 210 is disposed inside the mobility vehicle in the battery case 200, it is possible to reduce damage to the battery module 210 caused by the impact applied to the battery case 200.

In addition, since the air-conditioning duct 500 extends while being branched to both sides of the suction duct 300, the air-conditioning duct 500 may extend in a state of securing directionality toward the rear side seat. In particular, since a portion of the branched portion of the air-conditioning duct 500 is disposed to overlap the discharge duct 400 at a position spaced apart from the suction duct 300, it is possible to secure the cross-sectional area as well as directionality, thereby securing the amount of circulation of air.

In addition, since the discharge duct 400 is disposed close to the seat rail R disposed at the right side and extends between the suction duct 300 and the seat rail R disposed at the right side, it is possible to easily secure the cross-sectional area, and since the discharge duct 400 is disposed outside the mobility vehicle, it is possible to secure collision performance by absorbing an impact.

As described above, the duct apparatus for a mobility vehicle may have the battery case 200 provided under the body floor 100, thereby securing the interior space, and cool the battery module 210 using the inside air, thereby simplifying the cooling structure.

In particular, since the suction duct 300, the discharge duct 400, and the air-conditioning duct 500 are provided in the unused space between the seat rails under the seat, it is possible to secure the interior space, and through the optimized arrangement of the air-conditioning duct and the cooling duct of the battery module 210, it is possible to secure air-conditioning and battery cooling efficiency.

Although the specific embodiments of the present disclosure have been shown and described, it should be apparent to those having ordinary skill in the art that the present disclosure may be variously improved and changed without departing from the technical spirit of the present disclosure.

What is claimed is:

1. A duct apparatus for a mobility vehicle, comprising:

a body floor on which a plurality of seats are provided;

a battery case provided under the body floor, having a built-in battery module, and including an air inlet through which air is sucked and an air outlet through which the air is discharged;

a suction duct communicatively connected to the air inlet;

a discharge duct communicatively connected to the air outlet and configured to extend along the body floor; and an air-conditioning duct communicatively connected to an air conditioner and configured to extend along the body floor, wherein a portion of the air-conditioning duct is configured to extend to vertically overlap the discharge duct, wherein:

the battery case is provided under a front side seat on the body floor, the suction duct is provided under the front side seat, the discharge duct is provided under the front side seat and in front of the suction duct, and the discharge duct is configured to extend from the front side seat toward a rear side seat.

2. The duct apparatus of claim 1, wherein the discharge duct is formed to extend downward or laterally from the rear side seat.

3. The duct apparatus of claim 2, wherein the air-conditioning duct includes:

an inlet part connected to the air conditioner, and a plurality of outlet parts branched off to both sides of the suction duct, and wherein a first outlet part among the plurality of outlet parts is configured to extend to vertically overlap the discharge duct.

4. The duct apparatus of claim 3, wherein the first outlet part of the air-conditioning duct is positioned above the discharge duct.

5. The duct apparatus of claim 2, wherein the air-conditioning duct includes:

an inlet part connected to the air conditioner, and a plurality of outlet parts branched off to both sides of the suction duct, and wherein among the plurality of outlet parts, a first outlet part is configured to extend up to the front side seat, and a second outlet part is configured to extend up to the rear side seat.

6. The duct apparatus of claim 5, wherein the second outlet part is formed to overlap the discharge duct.

7. The duct apparatus of claim 1, wherein the battery case is disposed between a center of the mobility vehicle and an outside of the mobility vehicle, and a portion in which the discharge duct and the air-conditioning duct overlap each other is provided between the outside of the mobility vehicle and the suction duct.

8. The duct apparatus of claim 1, wherein the suction duct, the discharge duct, and the air-conditioning duct are provided between a pair of seat rails under a seat.

9. A duct apparatus for a mobility vehicle, comprising:

a body floor on which a plurality of seats are provided;

a battery case provided under the body floor, having a built-in battery module, and including an air inlet through which air is sucked and an air outlet through which the air is discharged;

a suction duct communicatively connected to the air inlet;

a discharge duct communicatively connected to the air outlet and configured to extend along the body floor; and an air-conditioning duct communicatively connected to an air conditioner and configured to extend along the body floor, wherein a portion of the air-conditioning duct is configured to extend to vertically overlap the discharge duct, wherein the suction duct, the discharge duct, and the air-conditioning duct are disposed between first and second seat rails and in the order of the first seat rail, the air-conditioning duct, the suction duct, the discharge duct, and the second seat rail from an inside to an outside of the mobility vehicle.

* * * * *